Feb. 14, 1933.                F. A. NODINE                1,897,814
                           SIDE WALL THERMOMETER
                            Filed Jan. 5, 1932
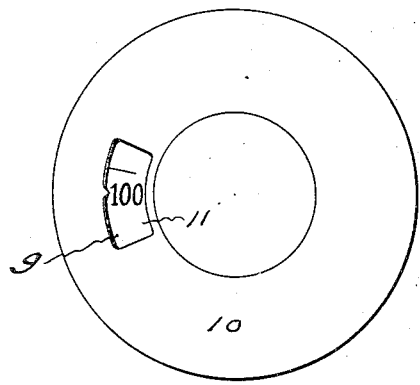
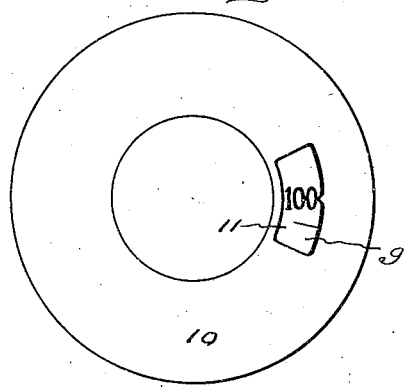
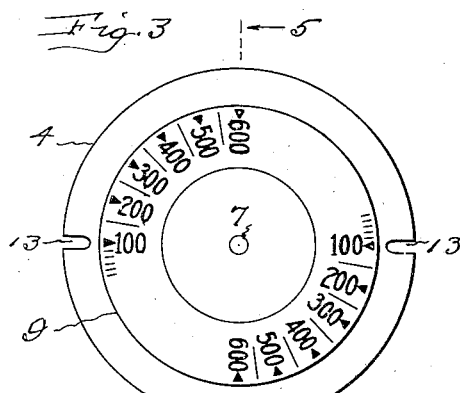
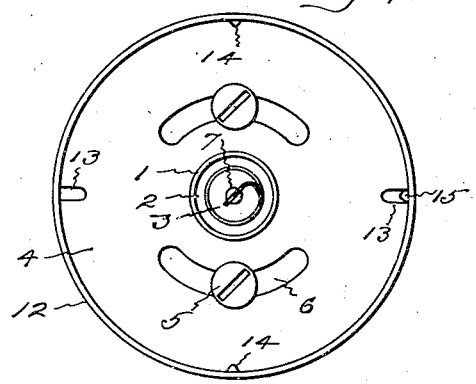
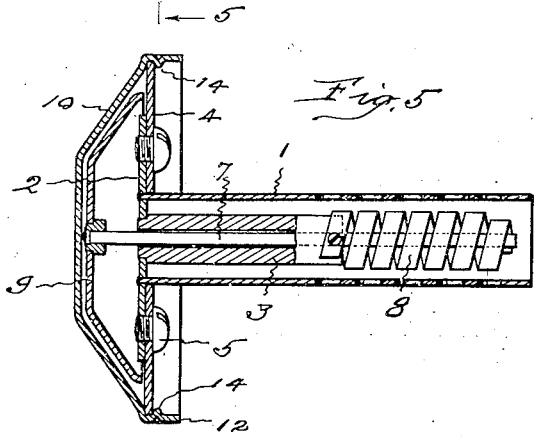
INVENTOR
Frederick A. Nodine by
Harry R. Williams
Atty.

Patented Feb. 14, 1933

1,897,814

UNITED STATES PATENT OFFICE

FREDERICK A. NODINE, OF TERRYVILLE, CONNECTICUT, ASSIGNOR TO THE COOPER OVEN THERMOMETER COMPANY, OF PLYMOUTH, CONNECTICUT, A CORPORATION OF CONNECTICUT

SIDE-WALL THERMOMETER

Application filed January 5, 1932. Serial No. 584,792.

This invention relates to a thermometer of the thermostatic class which is designed to be applied to the side-wall of an electric, or gas, or oil, or coal, heated oven for indicating the temperature therein.

The object of the invention is to provide a very simple thermometer of the type mentioned in which the thermo-responsive indicating dial is so marked, and the cover over the dial is so made and attached to the supporting means that it may be turned to one position if a left hand thermometer is desired, or turned to another position if a right hand thermometer is desired, and the numerals on the indicating dial will read correctly in either case.

In the embodiment of the invention illustrated the dial, which is connected with one end of a coiled thermostatic strip, has two similar series of indicating numerals arranged on its face with the respective numbers diametrically opposite but reading in the same angular direction, and the cover which has a single observation window is designed so that it may be applied to the supporting means in position to expose either of the series of indicating numerals, depending upon whether a right hand or left hand thermometer is desired.

In the accompanying drawing Fig. 1 shows a front view of a thermometer adapted for attachment to the right hand side-wall of an oven. Fig. 2 shows a similar view of the thermometer adapted for attachment to the left hand side-wall of an oven. Fig. 3 is a view with the cover removed in order to show the indicating dial. Fig. 4 is a back view of the thermometer. Fig. 5 shows a longitudinal section of the thermometer.

The form illustrated has a perforated supporting tube 1 designed to be passed through the oven wall. Attached to the front end of this tube is a disk 2. In the tube 1 is a tube 3 that is secured to the disk 2. A disk 4 is shown as fastened to the disk 2 by screws 5 that pass through slots 6 in the disk 4 and are threaded into the disk 2. When the screws are loosened the relative positions of these two disks may be angularly adjusted.

Extending through the tubes 1 and 3 and rotatably supported by the latter is a spindle 7. One end of a thermostatic coil 8 is attached to the inner end of this spindle. The other end of the thermostatic coil is secured to the inner tube. Fastened on the outer end of the spindle is a dial plate 9 which in the form shown is frustro-conical in section. The front inclined surface of this dial is preferably coated with porcelain and upon this surface are arranged the desired temperature indicating numerals. There are two series of these numerals, the numbers reading in the same angular direction around the periphery of the dial, with the respective numbers diametrically opposite each other.

Over the dial is a cover 10 with a window 11. The disk 4 which is of a size to loosely fit into the rim 12 of the cover, in its edge has two notches 13 that are diametrically opposite each other, and on the inner wall of the rim of the cover are two inwardly projecting diametrically arranged studs 14. In assembling the structure the cover is placed over the disk 4 in such position that the studs 14 on the rim of the cover will pass through the notches 13 in the edge of the disk and then the parts are turned relatively to each other so the unbroken edge of the disk will pass under the studs and the parts be held together thereby. The cover also has in its rim a stud 15 that is in the plane of the disk 4, and when the parts are put together the cover is turned until this stud 15 snaps into one of the notches 13 in the periphery of the disk 4 and thus retains the cover from turning relatively to the disk 4. To disassemble the parts the edge of the disk 4 is sprung above the stud 15 and the disk turned until the notches 13 coincide with the studs 14.

If a right hand thermometer is desired the cover is put on with the window on one side and if a left hand thermometer is desired the cover is put on in a diametrically opposite way.

When the cover is in position, whichever way it is put on, the numerals of one series on the dial will be exposed through the window. As the heat in the oven to which the thermometer is applied increases the thermostatic coil contracts and turns the dial so that the numerals which indicate the temperature can be readily observed through the window. For calibrating the thermometer the screws are loosened and the disk 2 is turned with relation to the disk 4 in the necessary direction to obtain the desired result, and then the screws are tightened up. After the device is once calibrated it is unnecessary to again disturb it. Any suitable means may be employed for securing the thermometer to the side wall of an oven with the supporting tube projecting into the interior.

The invention claimed is:

1. A thermometer comprising a supporting means, a spindle extending through the supporting means, a thermostatic strip with one end connected with the supporting means and the other end connected with the spindle, a dial on the spindle, said dial having a plurality of series of indicating numerals, and a cover with a single window, said cover having means whereby it may be attached to the supporting means with the said window positioned to expose either series of indicating numerals.

2. A thermometer comprising a tube, a spindle extending through said tube, a thermostatic coil with one end connected with said tube and the other end connected with the spindle, a dial on the spindle, said dial having two series of indicating numerals, and a cover with a single window, said cover having means whereby it may be attached over the dial with the said window positioned to expose either one or the other of the indicating numeral series.

3. A thermometer comprising a tube, a disk connected with said tube, a spindle extending through the tube, a thermostatic strip with one end connected with the tube and the other end connected with the spindle, a dial on the spindle, said dial having two series of indicating numerals, and a cover having a single window, said cover having means whereby it may be detachably applied to said disk with the said window positioned to expose either one or the other of the indicating numeral series.

4. A thermometer comprising a tube, a disk having a notched edge connected with said tube, a spindle extending through the tube, a thermostatic strip with one end connected with the tube and the other end connected with the spindle, a dial on the spindle, said dial having two series of indicating numerals, and a cover having a window, said cover having studs, which in cooperation with the notches in the edge of the disk, permit the cover to be applied over and attached to the disk with the window exposing either one of the other of the indicating numeral series.

5. A thermometer comprising a tube, a disk fixed to said tube, a disk with a notched edge adjustably connected with the fixed disk, a spindle extending through the tube, a thermostatic coil with one end connected with the tube and the other end connected with the spindle, a dial on the spindle, said dial having two series of indicating numerals, and a cover having a window, said cover having studs, which in cooperation with the notches in the edge of said notched disks, permit the cover to be applied over and attached to the notched disk with the window exposing either one or the other of the indicating numeral series.

6. A thermometer comprising a supporting tube, a spindle extending through said tube, a thermostatic coil with one end connected with the tube and the other end connected with the spindle, a dial on the spindle, said dial having two series of indicating numerals reading in the same angular direction with the respective numbers diametrically opposite, and a cover with a window, adapted to be applied over the dial with the window exposing either series of indicating numerals.

FREDERICK A. NODINE.